United States Patent [19]
Asano

[11] 4,249,708
[45] Feb. 10, 1981

[54] EMERGENCY LOCKING MECHANISM FOR THE SEAT BELT RETRACTOR OF VEHICLES

[75] Inventor: Shuichi Asano, Kawasaki, Japan

[73] Assignee: Nippon Seiko Kabushiki Kaisha, Tokyo, Japan

[21] Appl. No.: 76,333

[22] Filed: Sep. 17, 1979

[30] Foreign Application Priority Data

Sep. 29, 1978 [JP] Japan .............................. 53-120674
Apr. 18, 1979 [JP] Japan .............................. 54-48338

[51] Int. Cl.³ ...................... A62B 35/02; B65H 75/48
[52] U.S. Cl. ........................... 242/107.2; 242/107.4 A
[58] Field of Search ................ 242/107.2, 107.4 R, 242/107.4 E; 280/803–808; 297/478, 480

[56] References Cited

U.S. PATENT DOCUMENTS

| | | | |
|---|---|---|---|
| 3,664,598 | 5/1972 | Sherman | 242/107.4 R X |
| 3,817,473 | 6/1974 | Board et al. | 242/107.2 |
| 3,834,646 | 9/1974 | Heath | 242/107.4 A X |
| 4,120,466 | 10/1978 | Adomeit | 242/107.2 |
| 4,128,261 | 12/1978 | Paitula | 280/806 X |

Primary Examiner—John M. Jillions

[57] ABSTRACT

An emergency locking mechanism for a seat belt retractor comprises a take-up spool biased in a direction to take up the webbing of a seat belt, means for preventing withdrawal of the webbing from the take-up spool during emergency, a rotatable drum disposed parallel to the spool, a drum support bracket rotatably supporting the drum and rotatable about a center of rotation eccentric from that of the drum, drum rotation preventing means, and a fixed plate disposed in proximity to the drum for holding the webbing between the fixed plate and the drum during sudden impact.

13 Claims, 14 Drawing Figures

EMERGENCY LOCKING MECHANISM FOR THE SEAT BELT RETRACTOR OF VEHICLES

BACKGROUND OF THE INVENTION

1. Field of the Invention

This invention relates to an emergency locking mechanism for the retractor of a seat belt used in vehicles.

2. Description of the Prior Art

Seat belts are typically drawn out from a retractor and tighten against the body of a seat occupant of a vehicle. The seat belt system must be designed such that the seat belt will not become too tight when the seat occupant moves his body, and thus the seat belt can often be easily drawn out from its retractor, or rewound thereabound. However, when a sudden acceleration or deceleration is imparted to the vehicle body to exert a strong and sudden force on the seat occupant, the seat belt must be held by the retractor in order to hold the seat occupant in position.

SUMMARY OF THE INVENTION

The present invention intends to ensure that portions of a seat belt will be tightly held on the take-up spool of a retractor when a sudden impact or acceleration or deceleration is sensed, and to thereby prevent the seat belt from being drawn out.

Therefore, the emergency locking mechanism for seat belt retractor according to the present invention comprises a take-up spool biased in a direction to take up webbing, means for preventing withdrawal of the webbing from the take-up spool during emergency, a rotatable drum disposed parallel to the spool, the webbing being drawn out while being wrapped about the drum over a predetermined angular range, a drum support rotatably supporting the drum and rotatable about a center of rotation eccentric from the center of rotation of the drum, drum rotation preventing means for preventing rotation of the drum during emergency, thereby causing rotation of the drum and the drum support, and a fixed plate disposed in proximity to the drum so as to pass the webbing between the fixed plate and the drum, the webbing being nipped between the fixed plate and the drum when the drum and the drum support are rotated.

The invention will become more fully apparent from the following detailed description thereof taken in conjunction with the accompanying drawings.

DESCRIPTION OF THE PREFERRED EMBODIMENTS

Figure 1:
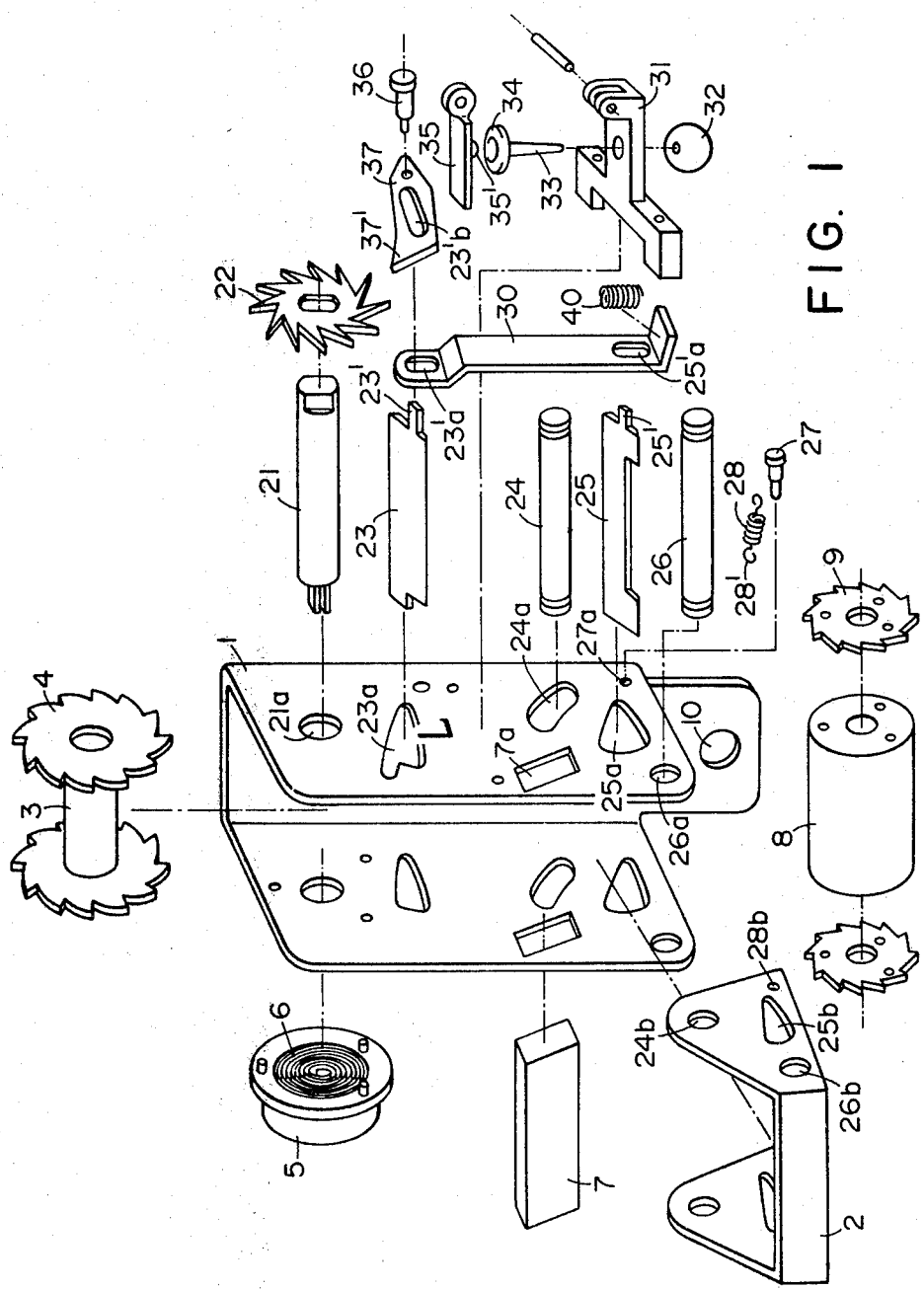
FIG. 1 is an exploded view of a device according to a first embodiment of the present invention.

In FIG. 1 which is an exploded view of parts of the device of the present invention, there are seen a base 1 to which various parts are attached, a drum support bracket 2 mounted so as to embrace the base 1 and supporting a drum 8, a take-up spool 3 which may have the webbing 50 of a seat belt wrapped therearound, first ratchet wheels 4 integrally secured to the opposite ends of the take-up spool, a spring case 5 for the take-up spool, a take-up spring 6 within case 5, a fixed plate 7 which may have the drum 8 urged thereagainst, second ratchet wheels 9 attached to the opposite ends of the drum 8, and a hole 10 for attaching the base 1 to a vehicle body. FIG. 1 further includes the shaft 21 of the take-up spool, an auxiliary gear 22 mounted on one end of the shaft 21, a first pawl 23 engageable with the first ratchet wheels 4 of the take-up spool, a drum shaft 24, a second pawl 25 engageable with the second ratchet wheels 9 secured to the drum 8, the shaft 26 of the drum support bracket for supporting the drum support bracket 2 with respect to the base 1, a pin 27 for holding one end of a drum support supporting spring, and a support spring 28. The shaft 21 of the take-up spool fits in a hole 21a formed in the base, and the first pawl 23 is rockably fitted in sector holes 23a formed in the base.

In FIG. 1, the upper portion of each hole 23a is shaped to permit the pawl 23 to fit therein. The fixed plate 7 is held within holes 7a and the drum shaft 24 is slidable within arcuate slots 24a formed in the base.

The second pawl 25 is rockably fitted in sector shaped holes 25a formed in the base, and the drum base shaft 26 is supported in holes 26a formed in the base. The pin 27 is supported in a hole 27a formed in the base and holds one end of the spring 28, while the other end 28' of the spring 28 is hooked in a hole 28b formed in the lower end of the drum base. The drum shaft 24 further passes through a hole 24b formed in the drum support bracket, the second pawl 25 passes through a sector shaped hole 25b formed in the drum support bracket, and the shaft 26 passes through holes 26b formed in the drum support bracket.

One end of the take-up shaft 21 is engaged with the spring 6 in the spring case 5 and the take-up spool is thus always biased for rotation in a direction to take up the webbing of the seat belt. The auxiliary gear 22 is mounted on the other end of the take-up shaft.

The end 23' of the first pawl 23 which is adjacent to the auxiliary gear 22 comes into a hole 23'a formed in the upper end of a lever 30, and one end 25' of the second pawl 25 fits in a hole 25'a formed in the lower end of the lever 30 and is urged against the upper end of the hole 25'a by a spring 40.

Outside the lever 30, a rod 33 suspending a pendulum 32 serving as an impact sensing means is supported by a support bed 31, and a lever 35 having a downwardly facing projection 35' engages the flat head 34 of the rod 33, and an auxiliary pawl 37 rockably supported by a pin 36 is provided above the lever 35. The end 23' of the first pawl passes through a hole 23'a in the lever 30 and extends into a hole 23'b in the auxiliary pawl 37.

While description has been made of an embodiment using an inertia device utilizing a pendulum as the means for sensing an impact or the like, the inertia device may alternatively be one utilizing a vertical type weight or one utilizing a steel ball to moving along a ramp.

As a further alternative, the inertia device may be one which senses sudden withdrawal of the webbing of the seat belt, instead of the inertia device which senses sudden impact or acceleration or deceleration of the vehicle.

Figures 2, 3:
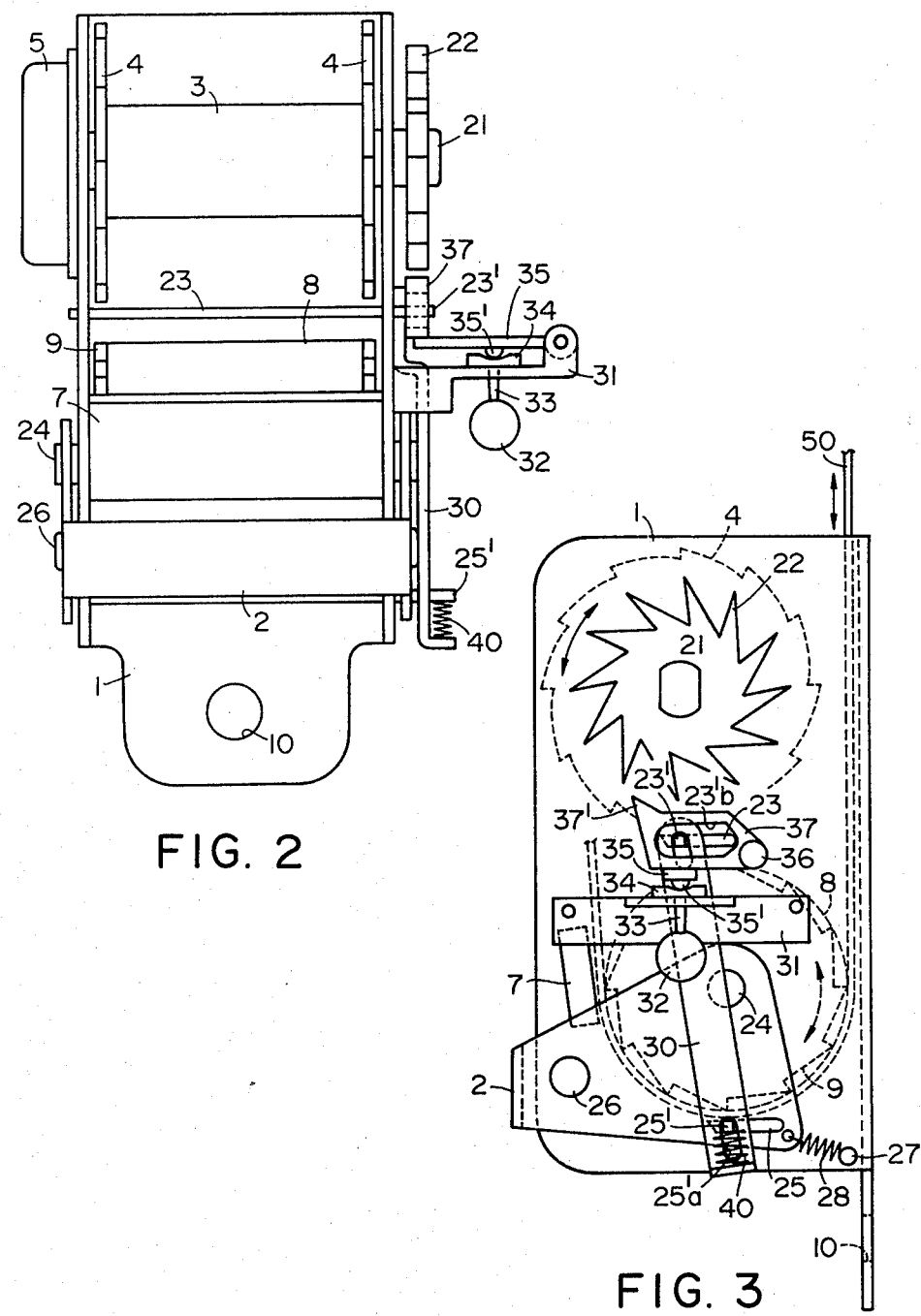
FIG. 2 is a front view of the same device.
FIG. 3 is a side view of the same device.

FIGS. 2 and 3 show this device when assembled, FIG. 2 being a front view and FIG. 3 being a side view of the device as seen from that side on which the auxiliary gear and the pendulum device lie.

FIGS. 2 and 3 show a position in which the seat belt may be withdrawn easily. The webbing 50 extending from the take-up spool 3 is wrapped around the drum 8 and then extends upwardly along the back side of the base 1, and the pendulum 32 vertically depends from the pendulum support bed 31 centrally mounted. The lever 35 extends horizontally and the drum 8 is spaced from the fixed plate 7, so that if the seat occupant moves his body, movement of the webbing is not prevented and the webbing may be withdrawn or rewound in response to the movement of the seat occupant.

Figure 4:
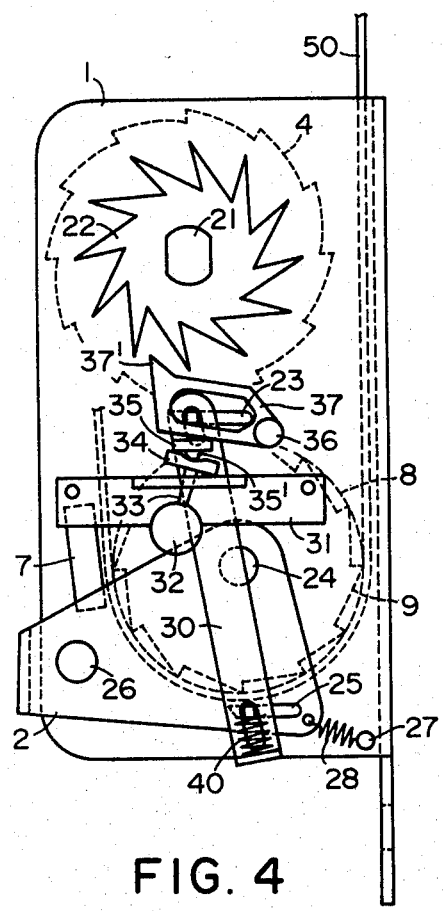
FIGS. 4, 5 and 6 show the sequence in which the webbing of a seat belt of the embodiment of FIG. 1 is locked.
Figure 5:
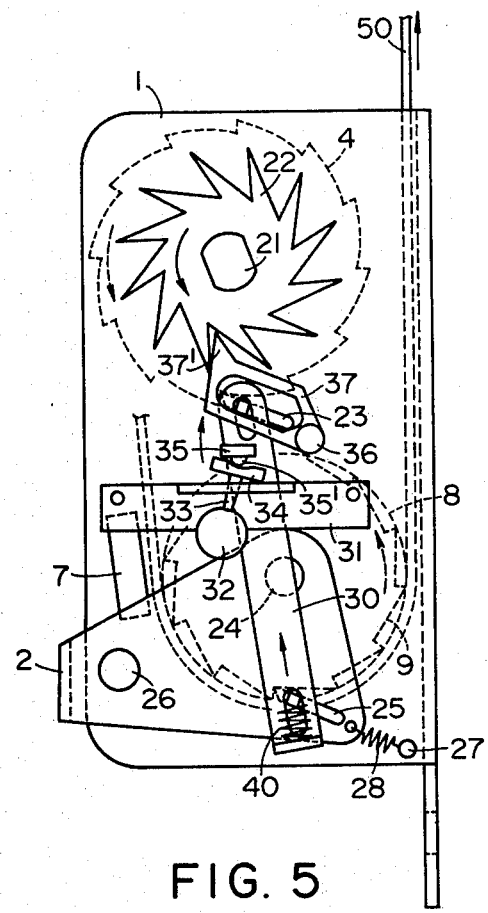

FIG. 4 shows a position in which a sudden impact or acceleration or deceleration is imparted to the vehicle body. The pendulum 32 swings to tilt the rod 33 and the horizontal head 34 of the rod pushes the lever 35 through the intermediacy of the projection 35', so that the lever 35 is raised to swing the auxiliary pawl 37 mounted above the lever upwardly. Thereupon, the end 37' of the auxiliary pawl slightly comes between the teeth of the auxiliary gear 22. When the body of the seat occupant is intensely pulled on by the impact, the webbing tries to be suddenly withdrawn from the take-up spool, but the take-up spool is rotated to thereby rotate the auxiliary gear 22 as well, whereupon, since the end 37' of the auxiliary pawl 37 has already slightly come into between the teeth, the auxiliary pawl is pushed by the teeth of the auxiliary gear and becomes spaced from the lever 35 and swings further upwardly to come more deeply between the teeth of the auxiliary gear, thus bringing about the position of FIG. 5.

Thereupon, the end 23' of the first pawl 23 which has been in the hole 23'b of the auxiliary pawl 37 is also raised and the pawl 23 is thus rotated in the sector hole 23a to come between the teeth of the first ratchet wheels 4 on the opposite ends of the spool 3, thus preventing counter-clockwise rotation of the take-up spool.

The end 23' is already in the hole 23'a formed in the upper end of the lever 30 and therefore, when the end 23' is raised, the lever 30 is also raised upwardly. Since the end 25' of the second pawl 25 is already in the hole 25'a formed in the lower end of the lever, the second pawl 25 is also rotated in the sector hole 25a of the base and the sector hole 25b of the drum base, so that the second pawl 25 comes between the teeth of the second ratchet wheels 9 on the opposite ends of the drum 8, thus preventing counter-clockwise rotation of the drum 8 as well.

However, since the webbing is being intensely pulled, tight winding of the webbing occurs on the spool and the webbing maybe drawn out by that amount.

Therefore, according to the present invention, the withdrawal of the webbing resulting from the tight winding is prevented by the pressure contact between the fixed plate 7 and the drum 8. That is, if the webbing 50 is pulled rightwardly and upwardly as viewed in the drawing when the rotation of both the take-up spool 3 and the drum 8 is prevented, as described above, the drum 8 and the drum support 2 supporting the drum are rotated counter-clockwise about the drum support shaft 26 against the force of the spring 28 and the shaft 24 of the drum 8 slides along a curved slot 24a, so that the drum 8 is brought into pressure contact with the fixed plate 7, thus bringing about the position of FIG. 6. Thus, the webbing extending from the take-up spool and wrapped around the drum 8 is tightened between the fixed plate 7 and the drum 8, and any withdrawal of the webbing resulting from the tight winding thereof on the take-up spool is prevented. The surface of the drum 8 may be knurled to provide good tightening of the webbing, but if knurled, the surface of the drum may damage the webbing and shorten the service life thereof and therefore, according to the present invention, the surface of one or both of the fixed plate 7 and the drum 8 is knurled or unknurled and on such knurled or unknurled surface, a friction member formed of resin such as vinyl chloride or polyurethane, or rubber which will not damage the webbing and which has a great friction coefficient is attached, fitted or cast. By doing so, good tightening of the webbing may be provided without damaging the webbing.

Figure 7:
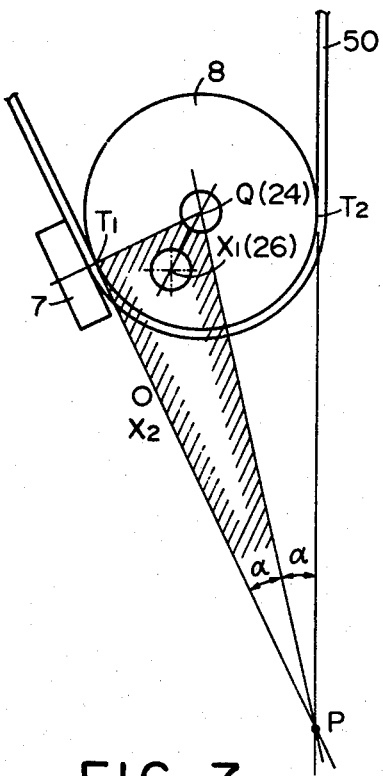
FIG. 7 illustrates the relation between a drum shaft and a shaft for the drum base of the embodiment of FIG. 1

FIG. 7 shows the relation between the axis of the drum 8 and the axis of the drum support and the fixed plate 7. The fixed plate 7 is preferably disposed adjacent to the drum 8 at the entrance side whereat the webbing withdrawn from the take-up spool begins to be wrapped around the drum, so that when the webbing is urged against the fixed plate 7 by the drum or nipped between the fixed plate and the drum, the webbing is wrapped around the periphery of the drum over a certain angular range, preferably, 120° to 180°, to its position on that side whereat the webbing is leaves the drum. By doing so, a great tension exerted on the webbing during emergency is absorbed over the aforementioned angular range of the drum periphery, otherwise the load to be webbing would be concentrated to break the webbing. To prevent such breakage of the webbing, the peripheral surface of the drum may particularly effectively be provided by a friction member of vinyl chloride, polyurethane or rubber as already noted.

Further, as shown in FIG. 7, let $T_1$ be the point of contact between the drum 8 and the fixed plate, Q be the center of the drum 8 (or the axis of the shaft 24), $T_2$ be the point on the circumference of the drum where the webbing leaving the drum forms a tangent therewith, $X_1$ be the axis of the shaft of the drum support bracket (or the axis of the shaft 26), and P be the point of intersection between the tangential lines passing through $T_1$ and $T_2$. Then, the wedging action by which the drum 8 is urged against the fixed plate 7 to prevent further withdrawn of the webbing acts effectively to intensely tighten the webbing when the point X which is the center of rotation of the drum support bracket lies within a triangle defined by $T_1PQ$, as indicated at $X_1$.

Figure 8:
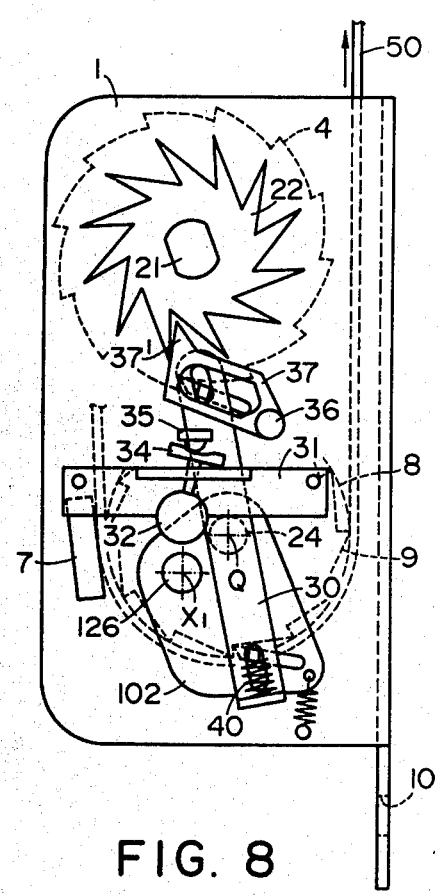
FIG. 8 is a side view of a second embodiment of the present invention.
Figure 9:
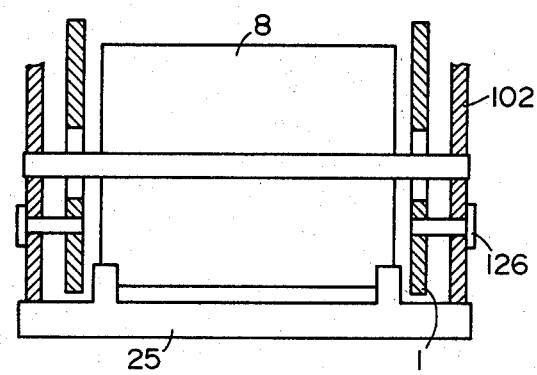
FIG. 9 is a schematic view illustrating the pin-shaped drum base shaft by sectioning a portion of FIG. 8.

However, in the embodiment hitherto described, the position of the center of the shaft 26 does not satisfy this condition, like the point $X_2$ shown in FIG. 7. FIGS. 8 and 9 show an embodiment in which the drum shaft of the drum support is bracket disposed at a position overlapping the drum 8, like the point $X_1$ indicated in FIG. 7.

Figure 6:
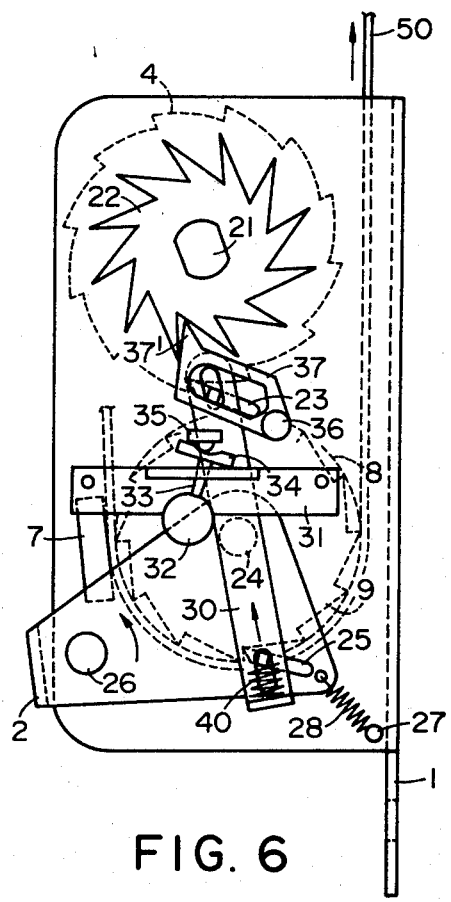

FIG. 8 is a side view of a second embodiment and shows the same position as that of FIG. 6. FIG. 9 is a schematic view provided by taking a section through $X_1$-Q axes of FIG. 8 and it illustrates a pin-shaped drum support shaft.

The device of this embodiment is similar to the first embodiment except for the drum support bracket and so, description of the entire device is omitted herein.

A drum support bracket 102 surrounds the base 1, and a support shaft 126 is in the form of a stub shaft formed like a pin and does not pass through the base as in the first embodiment and therefore can be positioned near the drum shaft 24, namely, at the position of $X_1$ as indicated in FIG. 7, so that the wedging action can act more effectively to enable the drum to be intensely urged against the fixed plate.

Figure 10:
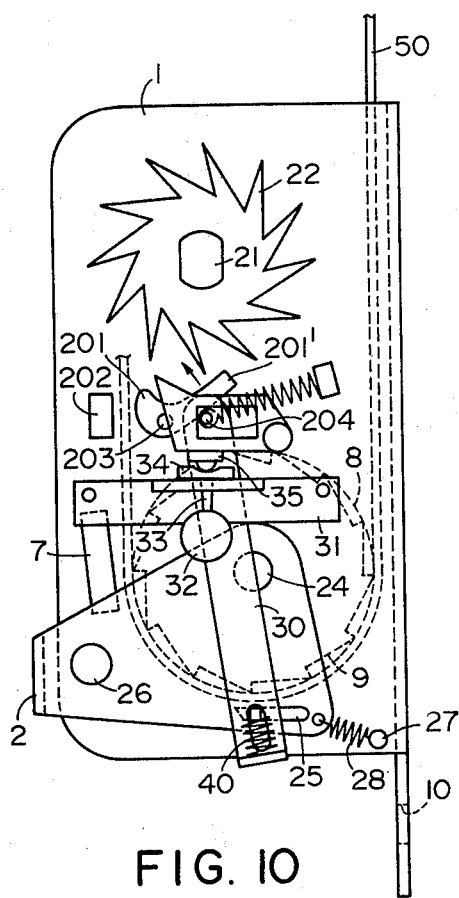
FIG. 10 is a side view of a third embodiment of the present invention.
Figure 11:
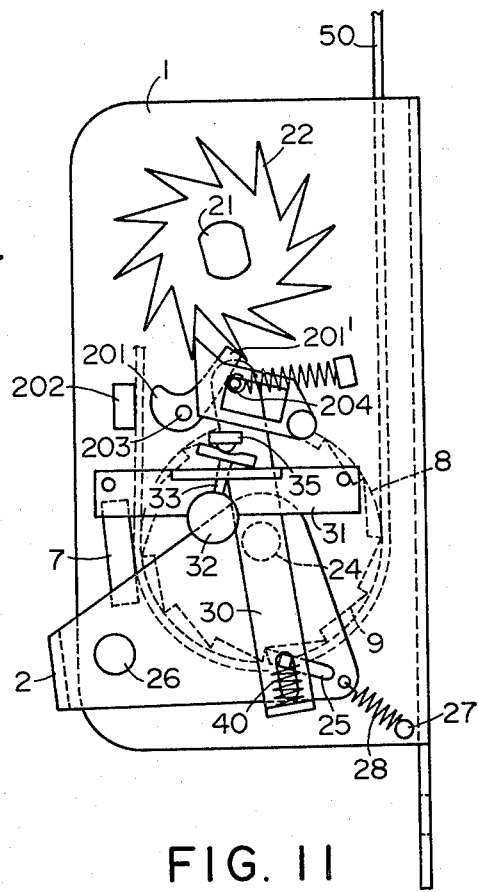
FIG. 11 shows the locked condition of the third embodiment.

FIGS. 10 and 11 show a third embodiment in which the withdrawal of the webbing resulting from the tightening thereof may be further minimized. FIG. 10 is a side view showing the non-locked condition, and FIG. 11 is a side view showing the locked condition.

In this embodiment, a chuck lever 201 is rockably mounted at a suitable location between the take-up spool and the fixed plate in the device shown in FIGS. 1-6, and a second fixed plate 202 is mounted at a corresponding position with the webbing 50 held therebetween. On the inner side of the lever 30, a pin 204 is mounted along the tail 201' of the chuck lever 201.

The device is normally in non-locked condition as shown in FIG. 10, but if, as already described, an impact is imparted to the vehicle body to swing the pendulum 32 and tilt the rod 33 to thereby cause the flat head 34 to raise the lever 35 and the auxiliary pawl 37 so that the auxiliary pawl 37 comes between the teeth of the auxiliary gear and subsequently the auxiliary gear is rotated, then the auxiliary pawl 37 is pushed away from the lever 35 by the auxiliary gear and further rotated counter-clockwisely, thus raising the lever 30 upwardly as already described. Thereupon, the tail 201' of the chuck lever 201 is also pushed upwardly by the pin 204 attached to the lever 30, so that the chuck lever 201 is also rotated counter-clockwisely and urged against the second fixed plate 202, as shown in FIG. 11, thus urging the webbing 50 against the plate 202. Subsequently, the drum 8 is urged against the fixed plate 7 to further tighten the webbing.

In this case, the pressure contact force with which the webbing is urged against the second fixed plate 202 by the chuck lever 201 need only be sufficient so that the drum 8 and the drum support may be rotated about the center $X_1$.

Figure 12:
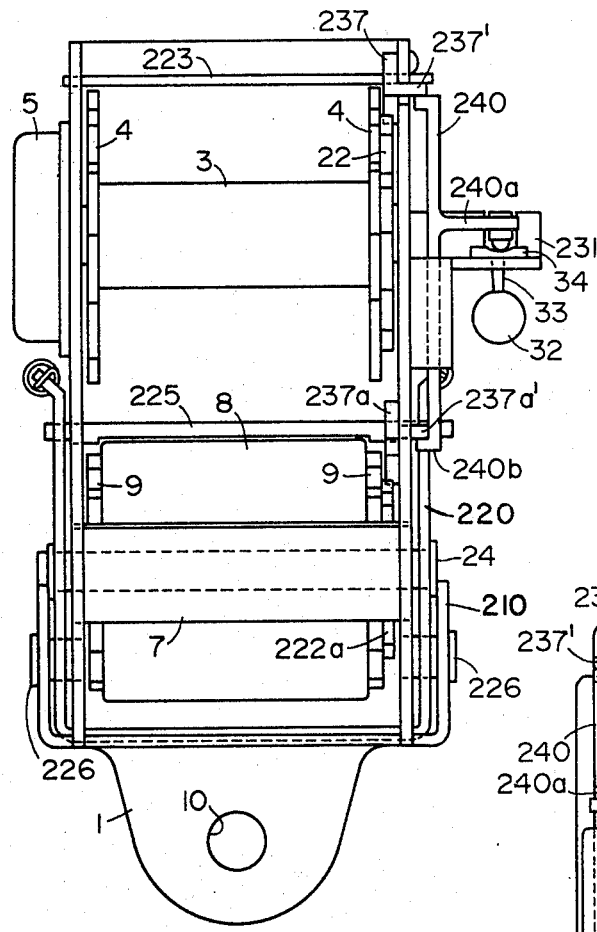
FIG. 12 is a front view of a fourth embodiment.
Figure 13:
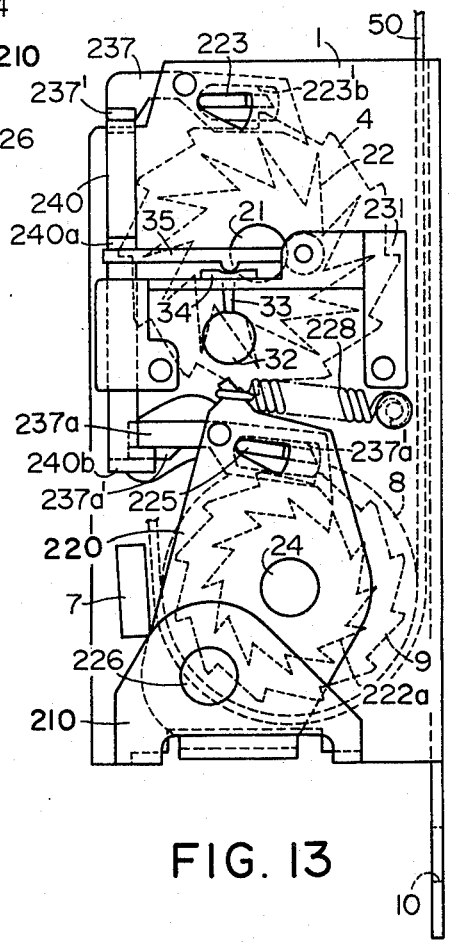
FIG. 13 is a side view of the fourth embodiment.
Figure 14:
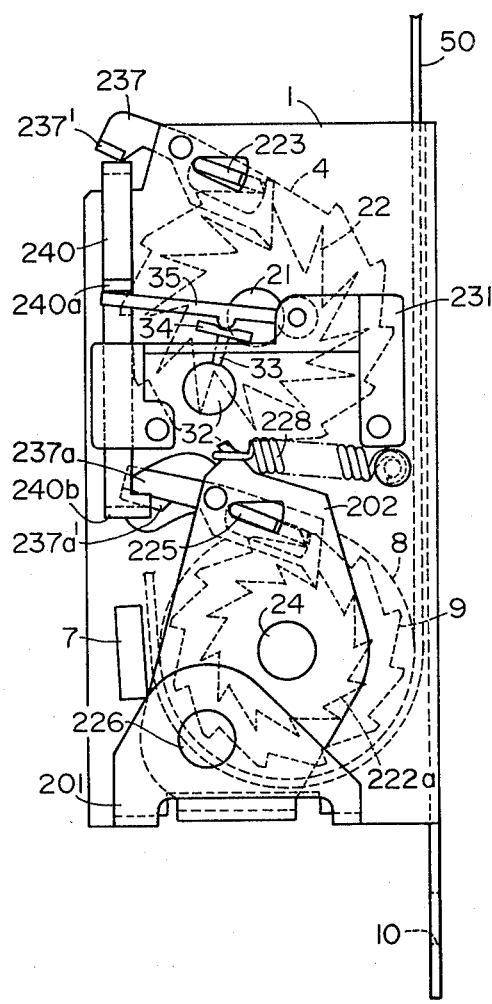
FIG. 14 is a side view of the fourth embodiment but showing a condition in which the emergency lock is operating.

Reference is now had to FIGS. 12 to 14 to describe a fourth embodiment of the present invention. In the fourth embodiment, the take-up shaft 21, as in the first embodiment, has first ratchet wheels 4 and an auxiliary gear 22 both integrally formed with the shaft 21. An auxiliary pawl 237 for engaging the auxiliary gear 22 during emergency is pivotally mounted on the upper portion of the base 1. A first pawl 223 having one end loosely fitted in a hole formed in the auxiliary pawl 237 is rockably disposed in a sector shaped hole of the base. When rocking in the manner to be described, the first pawl 223 engages the first ratchet wheels 4 to prevent rotation of the take-up spool, but it is normally held out of engagement with the first ratchet wheels by a spring (not shown).

A shaft 24 is rotatably provided on a drum support bracket 220 pivotally mounted on the lower portion 210 by means of a pivot pin 226 and biased by a spring 228, and the drum 8 is secured to the shaft 26. The drum 8 has secured thereto second ratchet wheels 9 and an auxiliary gear 222a. An auxiliary pawl 237a is pivotally supported on the upper portion of the drum support 202 and is engageable with the auxiliary gear 222a. A second pawl 225 having one end loosely fitted in the hole 237a' of the auxiliary pawl 237a is disposed in opposed sector shaped holes formed in the base and the drum support 202, as in the above-described embodiments, and is engageable with the second ratchet wheels 9, but it is normally biased into non-engaged position by a spring, not shown.

A pendulum 32 is suspended from a support bed 231 secured to the base, by means of a rod 33 and a flat head 34. A rockable lever 35 is also pivotally mounted on the support bed 231, and the downwardly facing projection 35' of the lever 35 is in engagement with the flat head 34, so that when the pendulum senses a predetermined variation in acceleration of the vehicle and is tilted due to inertia (FIG. 14), the rockable lever 35 pivots clockwise and the left end thereof is raised. A transmission lever 240 is vertically slidably provided to transmit the rocking movement of the rockable lever 35 to the aforementioned auxiliary pawls 237 and 237a. For that purpose, the transmission lever 240 has a branch 240a resting on the left end of the rockable lever 35.

The protrusion 237' of the auxiliary pawl 237 rests on the upper end of the transmission lever 240, and the protrusion 237b of the auxiliary pawl 237a rests on the projection 240b at the lower end of the transmission lever 240.

With such a construction, the auxiliary pawls 237, 237a and the first and second pawls 223 and 225 are normally in non-engagement with the auxiliary gears 22, 222a and the first and second ratchet wheels 4 and 9.

Now, when the pendulum 32 tilts by sensing a predetermined variation in speed of the vehicle, the lever 35 pivots to lift the transmission lever 240. By this lift, the auxiliary pawls 237 and 237a are brought into engagement with the auxiliary gears 22 and 222a, respectively. At this time, the webbing 50 has been suddenly drawn out, so that the auxiliary pawls 237 and 237a more deeply engage the auxiliary gears 22 and 222a, respectively, to thereby bring the first and second pawls 223 and 225 into engagement with the first and second ratchet wheels 4 and 9, thus stopping the rotation of the take-up spool and the drum. Thus, as in the above-described embodiments, the drum support 220 is rotated about the pivot pin 226 by the draw-out force of the webbing against the force of the spring 228, so that the webbing 50 becomes nipped between the peripheral surface of the drum and the fixed plate 7.

Next, in the device for locking the webbing by utilizing the drum support supporting the drum and having an axis of rotation eccentric with respect to the axis of rotation of the drum, the rotation of the drum is prevented when the webbing is suddenly intensely pulled on, and the drum support is rotated about its eccentric axis of rotation to urge the drum against the fixed plate and thereby intensely tighten the webbing between the drum and the fixed plate, thus preventing the webbing from being drawn out further from there.

The foregoing embodiments have been illustrated with respect to an example in which the withdrawal of the webbing of a seat belt from the take-up spool is prevented in response to the inertia sensing means which directly senses a variation in speed of the vehicle body by means of a pendulum, whereas the means for sensing a variation in speed of the vehicle body to prevent the withdrawal of the webbing from the take-up spool is not restricted to the illustrated one, but the means of the type which prevents withdrawal of the webbing by sensing a withdrawal acceleration of the webbing as disclosed in U.S. Pat. No. 3,450,368 granted to J. E. Glauser et al and U.S. Pat. No. 3,482,799 granted to R. J. Wrighton et al are also within the scope of the present invention.

I claim:

1. A mechanism for locking a seat belt retractor in response to sudden movement, comprising:
   a take-up spool biased to rotate in a direction winding said belt therearound;
   brake means operatively associated with said spool for enabling its rotation to be stopped;
   a drum held rotatably in parallel relation with said spool and having said seat belt wrapped over a predetermined length of the circumference of said drum;
   a fixed plate held in proximity to said drum;
   lock means including a pivotal support for holding said drum in a first position spaced from said fixed plate and operable during stopping of the rotation of said spool to pivot said drum into a second position gripping said seat belt between the drum circumference and said fixed plate;
   inertia sensitive means for sensing a predetermined variation in speed of movement; and
   transmission means operatively associated with said inertia sensitive means for actuating said brake means and said lock means.

2. An emergency locking mechanism for a seat belt retractor in a vehicle comprising:
   a take-up spool biased to rotate in a direction winding said seat belt therearound;
   brake means for inhibiting withdrawal of the seat belt from said take-up spool,
   lock means including a drum held rotatably in parallel relation with said spool and having said seat belt wrapped over a predetermined length of the circumference of said drum, and a support for rotatably supporting said drum and pivotable upon actuation of said brake means,
   a fixed plate held in proximity to said drum,
   inertia sensitive means for sensing a predetermined variation in speed of the vehicle; and
   transmission means operatively associated with said inertia sensitive means for actuating said brake means and said lock means, whereby upon vehicle emergency said brake means inhibits withdrawal of the seat belt and said seat belt is gripped between said fixed plate and said lock means.

3. An emergency locking mechanism for a seat belt retractor in a vehicle, comprising:
   a take-up spool biased in a direction winding said seat belt therearound,
   brake means for inhibiting withdrawal of the seat belt from said take-up spool,
   means for gripping said seat belt upon actuation of said brake means,
   inertia sensitive means sensing emergency of the vehicle, and
   transmission means operatively associated with said inertia sensitive means for actuating said brake means and said gripping means.

4. A mechanism according to claim 3, said brake means including lock means operatively associated with said spool for enabling its rotation in the direction of withdrawal of said seat belt to be stopped.

5. A mechanism according to claim 3, wherein said brake means includes a fixed plate provided in the vicinity of the path of the seat belt from said spool and means operatively associated with said inertia sensitive means to urge the seat belt against said fixed plate.

6. A mechanism according to claim 3, wherein said lock means includes a drum held rotatably in parallel relation with said spool and having said seat belt wrapped over a predetermined length of the circumference of said drum, a fixed plate held in proximity to said drum, and a pivotal support for holding said drum in a first position spaced from said fixed plate and operable during stopping of the rotation of said spool to pivot said drum into a second position gripping said seat belt between the drum circumference and said fixed plate.

7. An emergency locking mechanism according to claim 6 said fixed plate being located opposite that portion of said drum where said seat belt first engages the circumference thereof.

8. An emergency locking mechanism according to claim 7, said pivotal support having its center of pivot located within the area bounded by a first line extending tangent through the point on said drum where said seat belt first engages the circumference thereof, a second line extending from said point to the center of rotation of said drum and a third line extending from said center of rotation of said drum to the intersection of the tangent from the point on said drum where said seat belt leaves the circumference thereof and said first line.

9. An emergency locking mechanism for a seat belt retractor in a vehicle comprising:
   a take-up spool biased in a direction winding said seat belt therearound,
   inertia sensitive means for sensing emergency of the vehicle,
   braking means for inhibiting withdrawal of the seat belt from said spool in response to activation of said inertia sensitive means,
   lock means including a drum held rotatably in parallel relation with said spool and having said seat belt wrapped over a predetermined length of the circumference of said drum, a support for rotatably supporting said drum and pivotable when said braking means inhibits withdrawal of the seat belt, means for preventing rotation of said drum in response to activation of said inertia sensitive means,
   a first fixed plate disposed in proximity to said drum for passing the seat belt between the fixed plate and the drum, and
   said braking means includes a second fixed plate disposed in the vicinity of the path of the seat belt from said spool to said drum, and movable means operatively associated with said ineria sensitive means to urge the seat belt against said second fixed plate upon emergency of the vehicle to prevent withdrawal of the seat belt from said drum,
   whereby upon emergency of the vehicle said braking means inhibits withdrawal of the seat belt from said spool and the support of said lock means is pivoted so that the seat belt is gripped between said first fixed plate and said lock means.

10. An emergency locking mechanism according to any of claims 1, 2, 3, or 9, wherein said drum has a peripheral friction element.

11. An emergency locking mechanism according to claim 10, wherein said peripheral friction element is vinyl chloride.

12. An emergency locking mechanism according to claim 10, wherein said peripheral friction element is polyurethane.

13. An emergency locking mechanism according to claim 10, wherein said peripheral friction element is rubber.

* * * * *